July 1, 1958 R. H. SHEPPARD 2,841,427
CENTER POINT TRIPLE STEERING KNUCKLE
Filed Oct. 22, 1954 2 Sheets-Sheet 1

Inventor:
Richard H. Sheppard
By Henry H. Snelling
his Attorney

July 1, 1958 R. H. SHEPPARD 2,841,427
CENTER POINT TRIPLE STEERING KNUCKLE
Filed Oct. 22, 1954 2 Sheets-Sheet 2

Inventor:
Richard H. Sheppard
By Henry H. Snelling
his Attorney

United States Patent Office 2,841,427
Patented July 1, 1958

2,841,427

CENTER POINT TRIPLE STEERING KNUCKLE

Richard H. Sheppard, Hanover, Pa.

Application October 22, 1954, Serial No. 463,879

10 Claims. (Cl. 287—87)

This invention relates to mechanism for connecting the steering arm extending from the steering shaft of a vehicle to the ball and socket joints at the junctions of two oppositely directed tie rods and the lever arms extending from the non-vertical king pins which carry the axles of the guiding wheels of the vehicle, such mechanism being particularly useful wherever a joint consisting of three parts joined in articulated relation is required. An excellent example of this is a joint assembly or knuckle of a tractor positioned in the middle of an articulated tie rod and connecting both sides to a center steering arm at a single given point.

The principal object of the invention is to provide a steering knuckle which will permit a tractor or other vehicle to have a much smaller turning radius than is now possible with any other linkage system, especially a tractor having an articulated front axle.

A further object of the invention is to provide a steering knuckle in which the vertical distance required is less than where two simple joints are positioned side by side on the central steering arm or where two joints, one up and the other down, are on the same vertical center line. The knuckle of the present invention does not require that either tie rod be bent nor does it limit the articulation of the axle.

A still further object of the invention is to provide a joint in which a pair of spherically headed stubs each engage a central ball and a housing surrounds the heads of the studs in articulate bearing relation, the housing being constrained to move about the axis of the shank of the ball.

A still further object of the invention is to minimize wear by having a bearing in both portions of the cover or housing in order to prevent the cumulative wear which would occur if only the top housing portion had a bearing for the stem of the ball; also by having two or more holes in the upper shank of the ball so that the ball could be rotated through a chosen angle of 90° or less when the ball became slightly worn.

Figure 1:
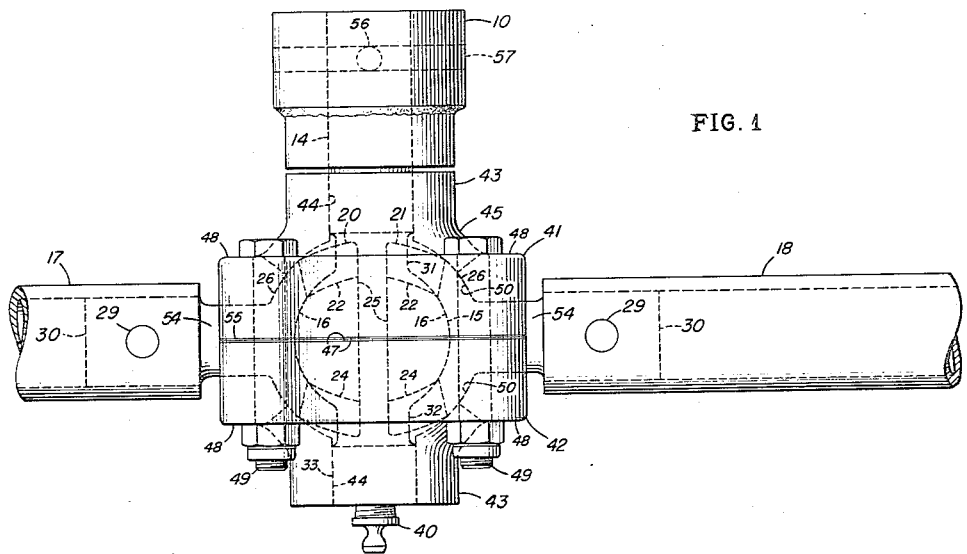
Figure 1 is a rear-elevation partly in section.
Figure 2:
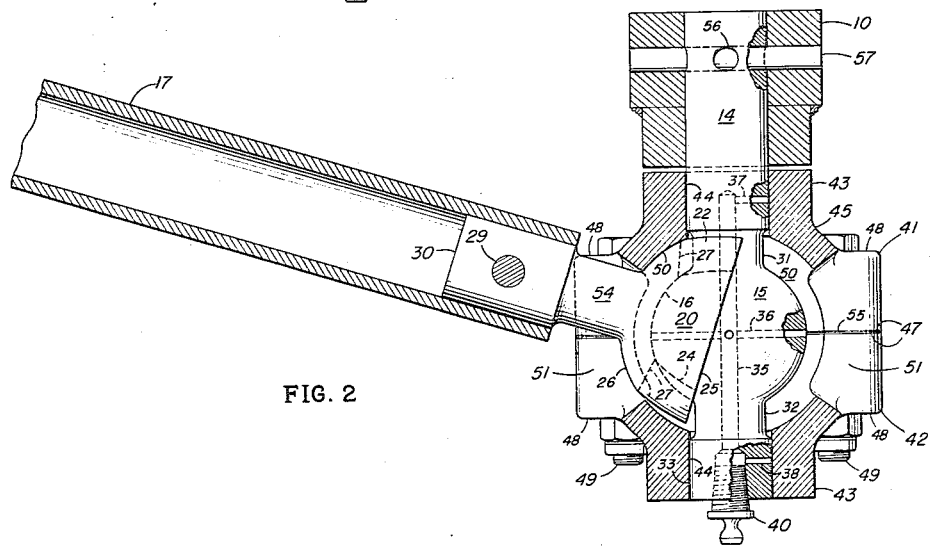
Figure 2 is a central vertical section with one tie rod and its cup omitted.
Figure 5:
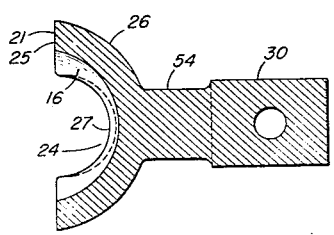
Figure 5 is a horizontal section through one of the spherically headed studs.
Figure 4:
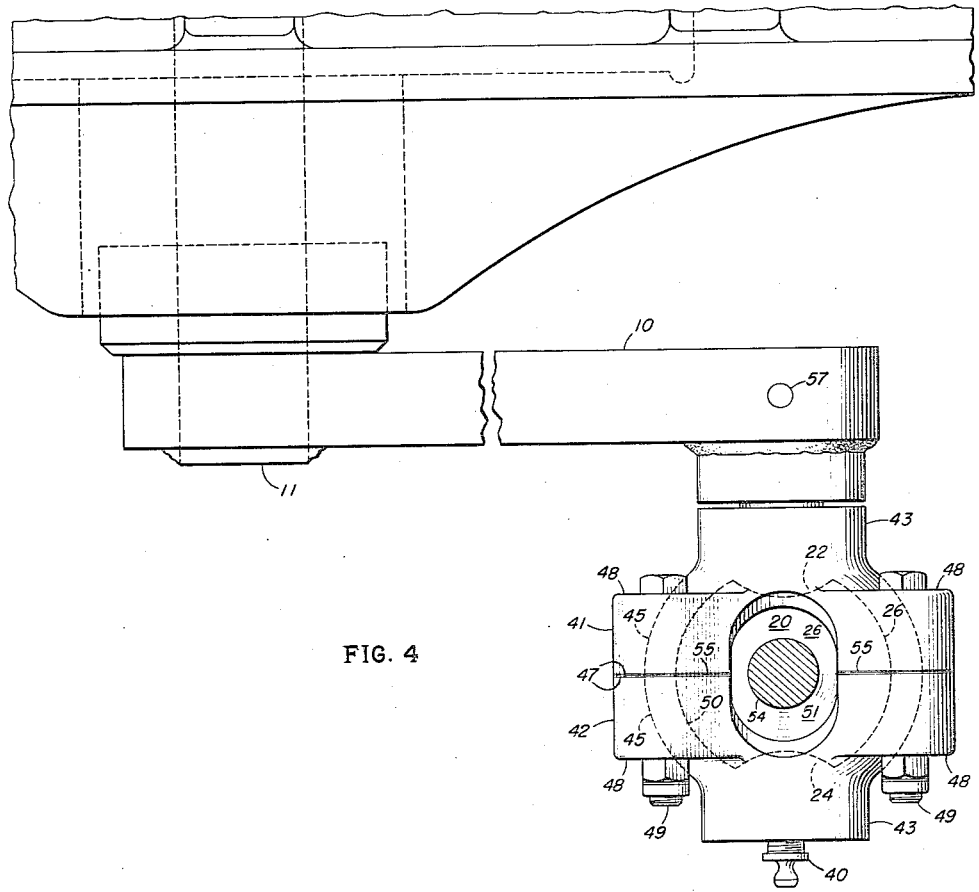
Figure 4 is a side elevation.
Figure 3:
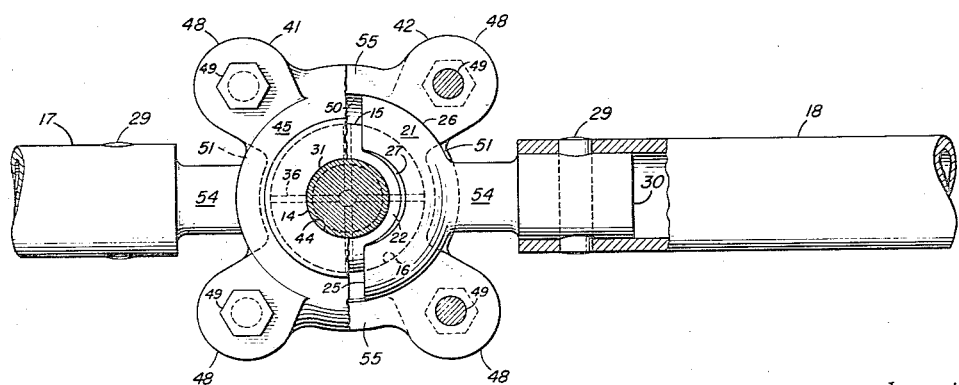
Figure 3 is a horizontal section.

The steering arm 10 is pivoted to the usual steering shaft 11 at one end and at its free end it carries the shank 14 of a ball 15, the center of which does not rise and fall where, as illustrated, the steering shaft 11 is vertical and the steering arm 10 horizontal. The tie rods 17 and 18 are on opposite sides of the ball 15 and each has a spherical head or cup snugly engaging the ball 15. The cups are numbered 20 and 21 each having spherical inner faces 16, spherical outer faces 26 and fairly large slots 22 and 24 in their upper and lower portions to clear the necks 31 and 32 of the ball member as the tie rods move up and down. The opposed plane faces 25 of the two cups or heads of the studs are spaced apart perhaps 5/16 of an inch for a ball of 1 5/8 diameter. As best seen in Figure 5 the curved face 27 of the slot is cylindrical, having a radius of 7/16 of an inch struck from a center 14° from the plane of the face 25 thus permitting the tie rods to rise to an angle of 25° or more before the bottom 27 of the slot 22 engages the neck of the ball 15. A pin 29 secures the chucking hub 30 of the headed stud to the tie rod 17 or 18.

While the shank 14 could carry at its bottom the ball 15, which then would have an entirely spherical surface except for the neck 31, it is preferred to provide an extension of the shank below the ball 15 thus providing an additional neck 32 and a cylindrical shank portion 33 in order to have a bearing in both halves of the cover as in so doing the sensitivity of the joint to wear is cut in half and the lower bearing 33 prevents the wear from being cumulative as it would be in absence of the portions 32 and 33. The two shanks and the two necks are integral with the ball. Proper lubrication of the triple steering knuckle is provided by the lubricating oil holes 35, 36, 37 and 38, the grease being forced in through the usual nipple 40 at the bottom of the ball member.

A housing of two similar parts 41 and 42 articulates with the cups 20 and 21 holding these members in sliding contact with the ball 15. Each housing portion has a neck 43 with a cylindrical recess 44 which forms a bearing for either the shank 14 in the case of the upper housing half or for the cylindrical portion 33 at the bottom of the ball members in case of the lower half.

Each of the housing halves has a plane face 47 which may engage the similar face of the other half of the housing. The four ears 48 on each housing portion or half receive the screws or bolts 49 for ready assembly. Each of the neck portions 43 merges into a dome 45, having within it a central spherical recess 50 of the same diameter as the outside surface 26 of the cups, that is a 2 1/4" diameter where the ball diameter is 1 5/8". The recess 50 opens to the cylindrical bearing 44 and also opens to side recesses 51 each one and one-eighth inches across and having its lower sides struck on a radius of 7/16 of an inch from centers 5/16" apart. The slot 51 therefore permits considerable up and down as well as lateral movements with respect to the neck 54 of each of the two cup-headed studs.

Although the two plane faces 47 may be in contact with each other, it is preferred that they be spaced apart to allow for taking up the joint for wear; consequently it is preferred that six shims 55 be placed between the faces 47, each shim four thousandths of an inch thick, this nicely taking up all wear that might be expected.

Another provision for lowering wear lies in the method of securing the shank 14 of the ball member to the steering arm 10, while using the regular pin 57. The shank 14 is provided with two holes 56 at right angles to each other, this permitting the ball member to be rotated 90° about its own axis in order to present a new surface to the cups after wear has taken place on the ball.

As will be noted, each of the two sockets or housing halves can only have its own back-lash between the ball and the cover. Without the neck 32 and the cylindrical portion 33, the bottom portion of the housing would have a full dome and the joint would borrow clearance from the upper socket on the other side of the ball and this would cause a tendency for the housing to rock slightly on its rather short bearing 44 on the ball stem.

What I claim is:

1. In combination, a steering arm movable about a vertical axis near one end thereof, a shanked ball adapted to be rigidly secured to the other end of the steering arm, a pair of spherical cups slidably engaging the ball on opposite sides thereof and having outside spherical surfaces, a tie rod rigidly secured to each cup, and a housing having a spherical cavity slidably engaging the outside surfaces of said cups and a communicating cylindrical cavity forming a bearing for the shank of the ball, whereby when the steering arm is moved about its vertical axis the ball will push one tie rod and pull the other, permitting each tie rod to have limited universal movement with respect to the ball as the housing turns about its bearing on the shank of the ball.

2. In a steering knuckle, a pair of spaced spherically headed studs, a ball between the studs, a housing surrounding the heads of the studs in articulate bearing relation thereto and having a cylindrical bearing the axis of which passes through the center of the ball, and a shank extending from the ball and forming a journal whereby said housing is constrained to rotate about said axis.

3. A center point triple steering knuckle including a ball having a shank, means for moving the shank with its axis constantly parallel to its initial position, a plurality of oppositely disposed members each having a head slidably engaging the ball and a housing having a spherical cavity concentric with the ball for holding the heads of the members in sliding contact with the ball and with the housing, and having a cylindrical cavity forming a snug bearing for said shank, whereby as the ball and its shank are moved laterally the members will have limited universal movement and the housing will move about the shank of the ball.

4. In combination, a steering shaft movable about a vertical axis, an elongated horizontal steering arm secured at one end to said shaft, a shank fixedly secured to the steering arm, said shank having a neck, a ball extending below the neck, a plurality of tie rods on opposite sides of the ball, a plurality of heads one secured to each tie rod through a neck, said heads each having a spherical surface engaging the ball and a similar concentric spherical surface forming the outside of the head, a housing surrounding the outer spherical surfaces of said heads and holding the heads in sliding contact with said ball, the housing having two open slots to receive freely the necks of the heads and each head being recessed to clear the neck of the ball as the tie rod and its head moves upwardly about the center of the ball.

5. In combination, a ball member including a ball having two diametrically opposite coaxial cylindrical shanks, a pair of members each with a cup having an inner spherical surface slidably engaging the surface of the ball and a larger coaxial spherical surface on the outside of the cup, a housing of two portions, each portion having a spherical surface slidingly engaging the outside of both cups and a cylindrical bearing for one of the two shanks of the ball, and means for securing the housing portions together to hold the cups in sliding engagement with the ball with limited universal movement.

6. The combination of claim 5 in which the two portions of the housing are separated by a plurality of shims, and one shank of the ball member is pierced by a plurality of bores at angles to each other so that by rotation of the ball member about the axis of the two shanks a new surface may be presented to the cups after the ball has become worn.

7. The knuckle of claim 4 in which the two sections of the housing have parallel flat faces in planes at right angles to the axis of the shank of the ball and the sections have apertured radial extensions through which securing means parallel to said axis may pass to hold the housing sections together.

8. A steering assembly for vehicles comprising a ball having a vertical cylindrical shank adapted to be rigidly secured to a horizontal steering arm movable about a vertical axis, a pair of tie rods, each having a cup with an inner spherical surface slidingly engaging the ball and an outer spherical concentric surface, a pair of housing socket members each having an inner spherical surface slidingly engaging the outer spherical surfaces of the cups, and means for securing the socket members together to enclose the ball and the two cups, whereby the tie rods will have limited universal movement with respect to the housing and also with respect to the ball as the steering arm is moved about its vertical axis.

9. A steering assembly for tractors comprising a steering shaft rotatable about its axis, a ball having a cylindrical shank on opposite sides with its axis parallel to the axis of the steering shaft, a steering arm rigidly connecting the steering shaft and the ball shank, a housing having bearings for the ball shank on both sides of the ball and having a spherical recess equispaced from the surface of the ball, and a pair of tie rods on opposite sides of the ball, each having a cup with inner and outer spherical surfaces located between the ball and the housing to slidingly engage both, whereby when the steering shaft is rotated one tie rod will be pushed and the other pulled and both tie rods have limited universal movement with respect to the ball and housing.

10. The steering knuckle of claim 2 in which the ball has oppositely directed coaxial shanks, the housing is in two parts each having a cylindrical bearing for one of the ball shanks, whereby the tendency of the housing to rock on the single bearing is minimized, and means for securing together the two housing parts with the ball and cups between them.

References Cited in the file of this patent

UNITED STATES PATENTS

| 613,014 | Martyn | Oct. 25, 1898 |
| 2,175,429 | Chayne | Oct. 10, 1939 |
| 2,614,862 | Alldredge et al. | Oct. 21, 1952 |
| 2,615,737 | Alldredge et al. | Oct. 28, 1952 |

FOREIGN PATENTS

| 525,354 | Great Britain | Aug. 27, 1940 |